United States Patent [19]

Walther et al.

[11] 4,142,569
[45] Mar. 6, 1979

[54] SEPARABLE SAFETY RIMS

[75] Inventors: William D. Walther; Louis F. Bolton, both of Dayton; Robert A. DeRegnaucourt, Centerville, all of Ohio

[73] Assignee: The Dayton Steel Foundry Company (Dayton-Walther Corporation), Dayton, Ohio

[21] Appl. No.: 848,515

[22] Filed: Nov. 4, 1977

Related U.S. Application Data

[63] Continuation of Ser. No. 606,502, Aug. 21, 1975, abandoned, which is a continuation of Ser. No. 197,666, Nov. 11, 1971, abandoned.

[51] Int. Cl.² .............. B60B 1/14; B60B 3/04; B60B 3/10; B60B 25/14
[52] U.S. Cl. .................. 152/409; 152/376; 152/397; 301/11 R; 301/13 SM; 301/23; 301/24; 301/35 R; 301/36 R
[58] Field of Search ............ 152/362, 375, 376, 379.1, 152/379.2, 382, 383, 385, 386, 396, 397, 398, 400, 405, 406, 407, 408, 409, 410, 411, 412, 413; 301/11 R, 12 R, 12 M, 13 R, 13 SM, 23, 24, 35 R, 35 SS, 35 SL, 36 R

[56] References Cited

U.S. PATENT DOCUMENTS

| Re. 27,220 | 11/1971 | Walther | 301/12 R |
|---|---|---|---|
| 1,252,077 | 1/1918 | Beery | 152/409 |
| 1,333,679 | 3/1920 | Rey | 152/398 |
| 1,434,222 | 10/1922 | Perlman | 152/407 X |
| 1,609,099 | 11/1926 | Antilotti et al. | 152/398 X |
| 1,739,877 | 12/1929 | Wagenhorst | 301/24 |
| 1,817,700 | 8/1931 | Miller | 152/396 |
| 1,875,331 | 9/1932 | Evans | 301/13 SM |
| 2,253,320 | 8/1941 | Berg | 152/411 |
| 2,410,573 | 11/1946 | Eksergian | 152/411 X |
| 2,633,178 | 3/1953 | Leaf | 301/23 X |
| 3,090,649 | 5/1963 | Walther, Sr. | 301/13 SM |
| 3,304,124 | 2/1967 | Brown et al. | 301/13 SM X |
| 3,421,797 | 1/1969 | Walther | 301/12 R |
| 3,529,869 | 9/1970 | Casey | 301/11 R |

FOREIGN PATENT DOCUMENTS

| 24235 | 5/1906 | Austria | 152/405 |
| 972008 | 7/1975 | Canada | 152/409 |
| 324961 | 11/1957 | Switzerland | 152/376 |
| 746680 | 3/1956 | United Kingdom | 152/376 |

Primary Examiner—L. J. Paperner
Assistant Examiner—Howard Beltran
Attorney, Agent, or Firm—Mack D. Cook, II

[57] ABSTRACT

Two-piece rim for mounting tires, single or dual, on a wheel. The removable bead ring has an axial projection intended for engagement by restraining means mounted on the wheel in the event a tire on said rim is unintentionally deflated. Various forms of restraining means are provided.

11 Claims, 8 Drawing Figures

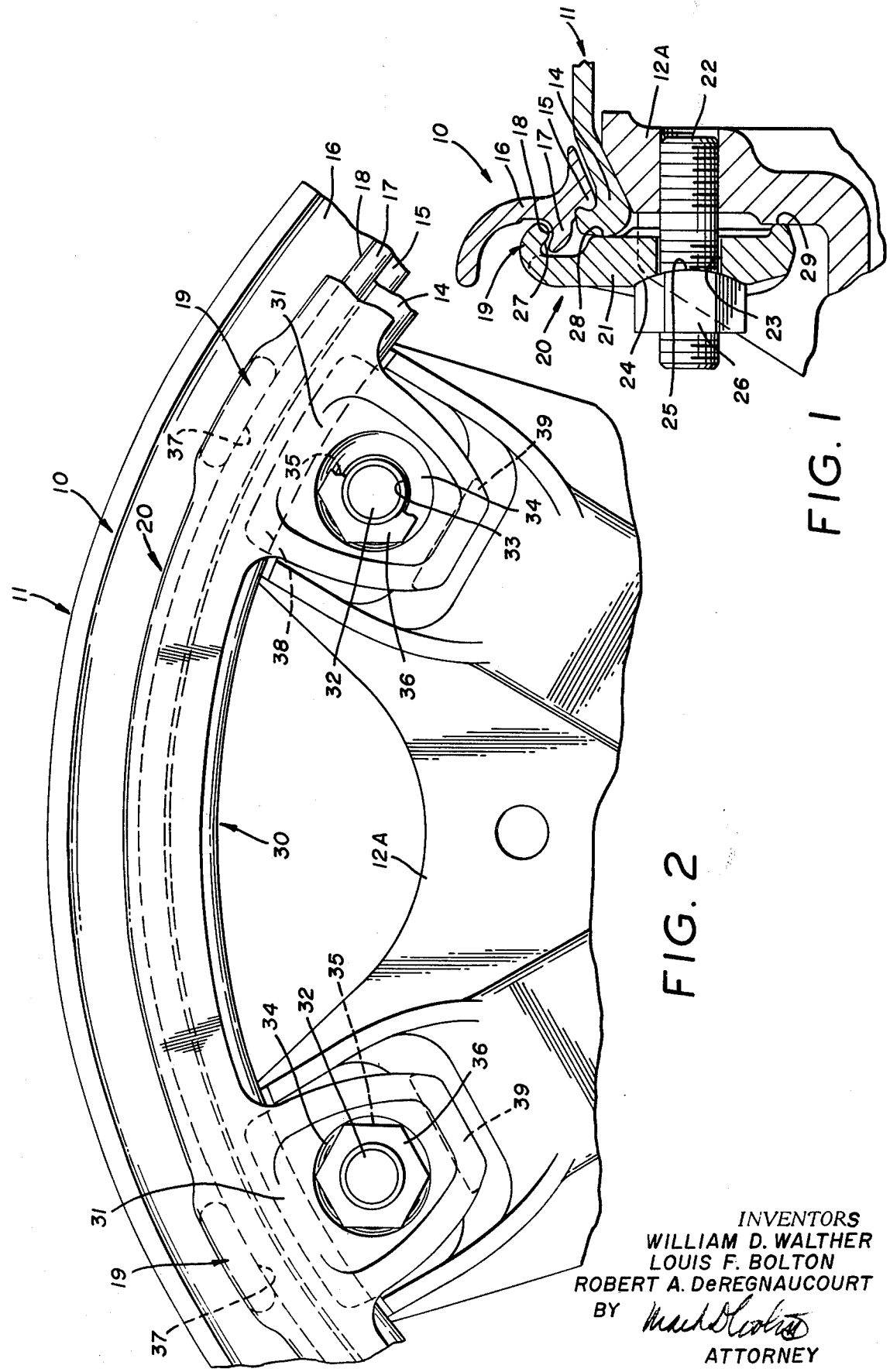

SEPARABLE SAFETY RIMS

This application is a continuation of application Ser. No. 606,502, filed Aug. 21, 1975, now abandoned, which was a continuation of application Ser. No. 197,666, filed Nov. 11, 1971, now abandoned.

BACKGROUND OF THE INVENTION

A prior art two-piece rim for mounting tires on a wheel is disclosed in U.S. Pat. No. 3,421,797.

SUMMARY OF THE INVENTION

It is an object of the invention to improve the safety and operation of tire carrying rims with a removable bead ring when the rims are being mounted or are mounted on a vehicle wheel.

It is a further object to provide improved combinations of vehicle wheels and demountable rims with removable bead rings wherein each wheel and rim has thereon cooperating elements with the contingent function of preventing unintentional or accidental demounting of either a tire or a removable bead ring.

These and other objects of the present invention, and the advantages thereof, will be apparent in view of the Detailed Description of the Invention as set forth below.

In general, the invention relates to the combination of a vehicle wheel and at least one tire carrying rim. Each rim comprises a fixed integral bead flange and a removable bead ring having a radially directed bead flange. The medial portion or side of the bead flange of the removable bead ring has an axial projection providing a radially outwardly oriented annular shelf surface. The wheel mounts a restraining means comprising an axial projection providing a radially inwardly oriented surface which in mounted condition is positioned radially outside of and opposite to the annular shelf surface. The opposed surfaces of the axial projections are intended for engagement in the event a tire on the rim is unintentionally deflated.

In the embodiment of FIG. 1, the restraining means comprises a series of substantially triangularly-shaped clamp lugs mounted on bolts projecting axially of the wheel. The base region of a lug carries the axial restraining projection intended for engagement with the bead ring. The axially inner face of a lug has a radially directed surface for clamping engagement with the cove area on the rim. The apex region of a lug has an axial projection for seating engagement with the wheel.

In the embodiment of FIG. 2, the restraining means comprises a full ring member with substantially triangularly-shaped clamp areas mounted on bolts projecting axially of the wheel. The base region of an area carries the axial restraining projection intended for engagement with the bead ring. The axially inner face of an area has a radially directed surface for clamping engagement with the cove area on the rim. The apex region of an area has an axial projection for seating engagement with the wheel.

In the embodiment of FIG. 3, the restraining means comprises a series of two-piece clamp lugs mounted on bolts projected axially of the wheel. Each clamp lug has an axially outer element and an axially inner element. The radially outer portion of the inner element carries the axial restraining projection intended for engagement with the bead ring. The axially inner face of the inner element has an axially concave surface for clamping engagement with the cove area of the rim. The radially inner portion of the outer element has an axial projection for seating engagement with the wheel.

The restraining means embodiment of FIG. 3 is further characterized in that the mating surfaces of the outer and inner elements are in conjugate contact permitting limited adjustment of the axial restraining projection relative to the bead ring during mounting on the wheel.

The restraining means depicted in FIGS. 1–3 may be generally described as for use in combination with a wheel having a series of axially projecting bolts and a two-piece rim for mounting a tire on the wheel. The removable bead ring for the rim has a medial portion with an axial projection providing a radially outwardly oriented annular shelf surface. A series of bolt mounted axial restraining projections with a radially inwardly oriented surface overlie the axial projection on the bead ring and are intended for engagement therewith when a tire on said rim is unintentionally deflated.

The restraining means depicted in FIGS. 1–3 may be further described in that the removable bead ring is mounted in a cove area on the rim and the axial restraining projections are carried by bolt mounted elements having an axially inner face with a surface intended for clamping engagement with the cove area on the rim.

The restraining means depicted in FIGS. 1–3 may be further described in that the wheel bolts are loosely received in an axial bore in the clamping element. The axially outer opening of a bore has a concentrically concave surface adapted for engaging the ball face of a nut threaded and tightened on a bolt to mount the clamping element on a wheel.

The restraining means depicted in FIGS. 4 and 5 may be generally described as for use with inner and outer two-piece rims separated by a spacer for mounting tires on the felly surface of a dual wheel.

In the embodiment of FIG. 4, the restraining means comprises a dual restraining ring and spacer assembly seated on the wheel felly surface between the rims. The radially outer portion of an annular ring carries the axial restraining projection intended for engagement with a ring. The base portion of a ring radially inwardly of a restraining projection has a radially directed surface for clamping engagement with the cove area on an adjacent rim. The opposite side of the base portion has a surface adapted for secure mechanical engagement with the spacer.

In the embodiment of FIG. 5, the restraining means comprises a spacer seated on the wheel felly surface between the rims. The radially outer portions of an annular rigid and non-deformable spacer carry the axial restraining projections intended for engagement with an adjacent bead ring.

The restraining means depicted in FIG. 5 may be further characterized in that the radially outer portions of the spacer are "C-shaped" with the upper legs thereof constituting the restraining projections. The spacer also has radially directed surfaces for clamping engagement with the cove area of an adjacent rim.

The restraining means depicted in FIG. 6 may be generally described as for use with a rim for mounting a tire on a wheel having a felly surface for seating the medial portion of a rim.

In the embodiment of FIG. 6, the wheel is a disc wheel having a body portion and the restraining means comprises projecting elements attached to the wheel body portion. The radially outer portions of the projecting elements carry the axial restraining projections intended for engagement with a bead ring.

DESCRIPTION OF THE DRAWINGS

FIG. 1 is a view in section of a restraining means according to the invention comprising a series of one-piece clamp lugs for a single wheel;

FIG. 2 is a fragmentary plan view, partially broken away in one clamping area, showing a restraining means according to the invention comprising a full ring clamp member for a single wheel;

DETAILED DESCRIPTION OF THE INVENTION

Figure 8:
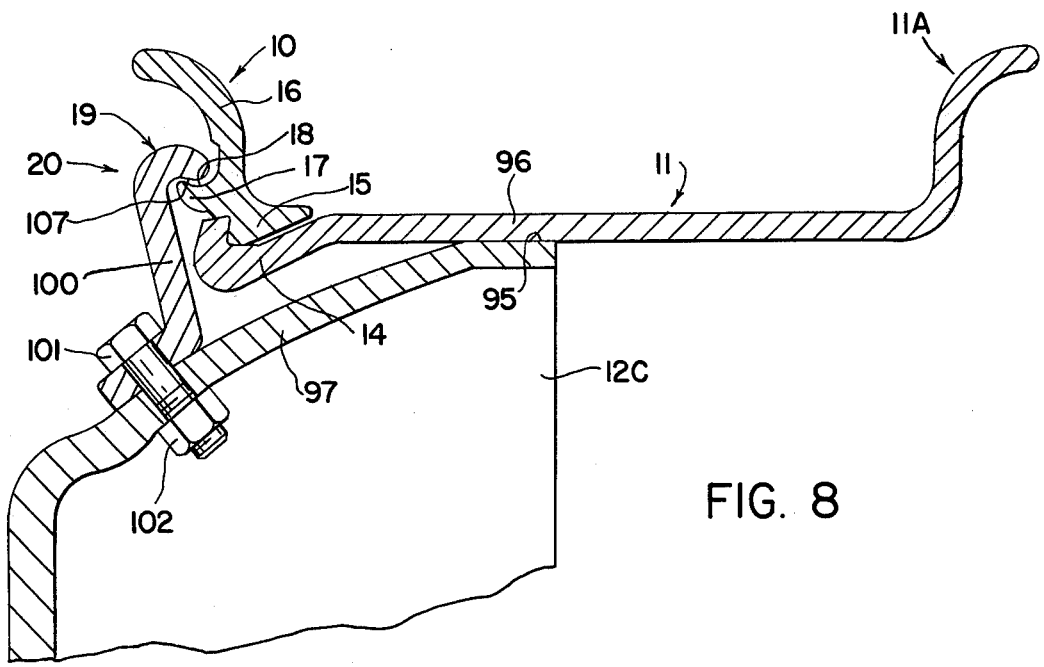
FIG. 8 is a sectional view showing a rim for mounting a tire, said rim having a fixed integral bead flange.

In each of the embodiments depicted herein, a removable bead ring according to the invention is indicated generally by the numeral 10. The bead ring 10 is used as part of a rim 11 for mounting a tire (not shown) on either a single wheel 12A or 12C or a dual wheel 12B. The rim 11 has an integral bead flange 11A, see FIG. 8. The edge of rim 11 opposite to the fixed bead flange has an annular concave cove area 14 for secure mechanical engagement with a convex base portion 15 of a bead ring 10. The radially outer portion 16 of a bead ring 10 functions as a tire bead retainer flange.

The medial portion of a ring 10 has an axial projection 17 providing a radially outwardly oriented annular concave shelf surface 18 intended for engagement with a correspondingly shaped axial projection 19 on a restraining means, referred to generally by the numeral 20, in the event a tire on the rim 11 is unintentionally deflated.

The embodiment of the restraining means 20 depicted in FIG. 1 is a one-piece clamp lug for a single wheel 12A. A clamp lug 21 is substantially triangularly-shaped and is mounted on a bolt 22 projecting axially of the wheel 12A. The bolt 22 is loosely received within an axial bore 23. The axially outer opening of a bore 23 has a concentrically concave surface 24 adapted for engaging the ball face 25 of a nut 26 threaded and tightened on a bolt 22.

The axial restraining projection 19 is on the base region of the clamp lug 21, so as to provide a radially inwardly oriented surface 27 overlying the corresponding surface 18 on the axial projection 17 on the bead ring 10. The axially inner face of a clamp lug 21 has a radially directed surface 28 for clamping engagement with the cove area 14 of a rim 11. The apex region of a clamp lug 21 has an axial projection 29 for seating engagement with the wheel 12A.

The embodiment of the restraining means 20 depicted in FIG. 2 is an annular or rull ring clamp member for a single wheel 12A. A ring member 30 has a series of triangularly-shaped clamp areas 31, similar in cross-section to the clamp lug 21 of FIG. 1, and is mounted on a series of bolts 32 projecting axially of the wheel 12A. Each bolt 32 is loosely received within an axial bore 33. The axially outer opening of a bore 33 has a concentrically concave surface 34 adapted for engaging the ball face 35 of a nut 36 threaded and tightened on a bolt 32.

The axial restraining projection 19 is on the base region of each clamp area 31 so as to provide a radially inwardly oriented hook surface 37 overlying the corresponding surface 18 on the axial projection 17 on the bead ring 10. The axially inner face of a clamp area 31 has a radially directed surface 38 for clamping engagement with the cove area 14 of a rim 11. The apex region of a clamp area 31 has an axial projection 39 for seating engagement with the wheel 12A.

Figure 3:
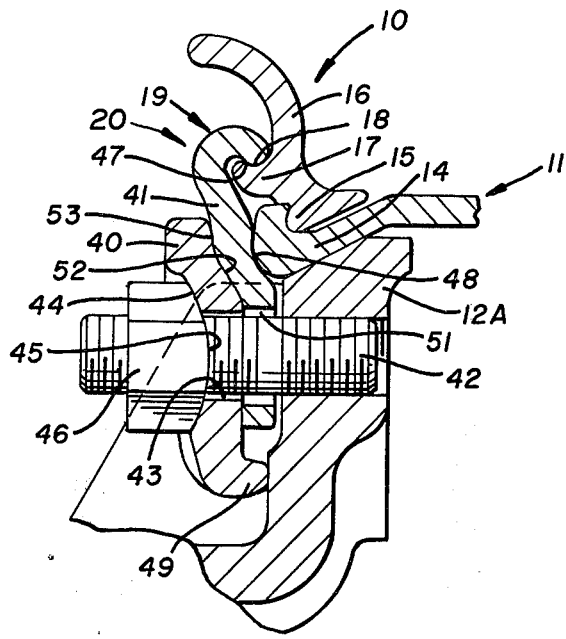
FIG. 3 is a view in section of a restraining means according to the invention comprising a series of two-piece clamp lugs for a single wheel.

The embodiment of the restraining means 20 depicted in FIG. 3 is a two-piece clamp lug for a single wheel 12A. Each clamp lug has an axially outer element 40 and an axially inner element 41. A clamp element 40 is mounted on a bolt 42 projecting axially of the wheel 12A. The bolt 42 is loosely received within an axial bore 43. The axially outer opening of a bore 43 has a concentrically concave surface 44 adapted for engaging the ball face 45 of a nut 46 threaded and tightened on a bolt 42.

The axial restraining projection 19 is on the radially outer end of the clamp element 41, so as to provide a radially inwardly oriented hook surface 47 overlying the corresponding surface 18 on the axial projection 17 on the bead ring 10. The axially inner face of the clamp element 41 has an axially concave surface 48 for clamping engagement with the cove area 14 of a rim 11. The radially inner end of the clamp element 40 has an axial projection 49 for seating engagement with the wheel 12A.

The two-piece clamp lug of FIG. 3 permits limited adjustment of the restraining projection 19 relative to the axial projection 17 on the bead ring 10, as the clamp lug elements are being operably mounted on a wheel 12A. As shown, the radially inner end of element 41 has an enlarged bore or slot 51 permitting of movement in relation to the bolt 42. The mating surfaces 52 and 53 of the elements 40 and 41 are in conjugate contact. More specifically, the inner surface 52 of element 40 and the outer surface 53 of element 41 are each sinuate beginning at their radially inner ends and becoming substantially radially directed beginning near their radially outer ends.

Figure 5:
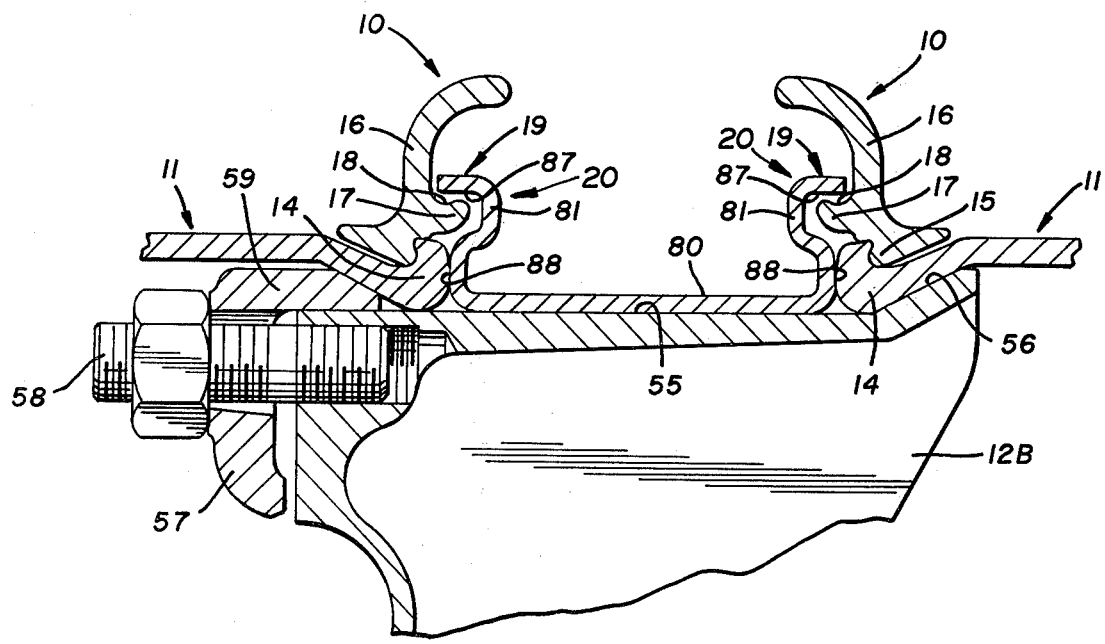
FIG. 5 is a view in section of a restraining means according to the invention comprising a spacer for a dual wheel.
Figure 4:
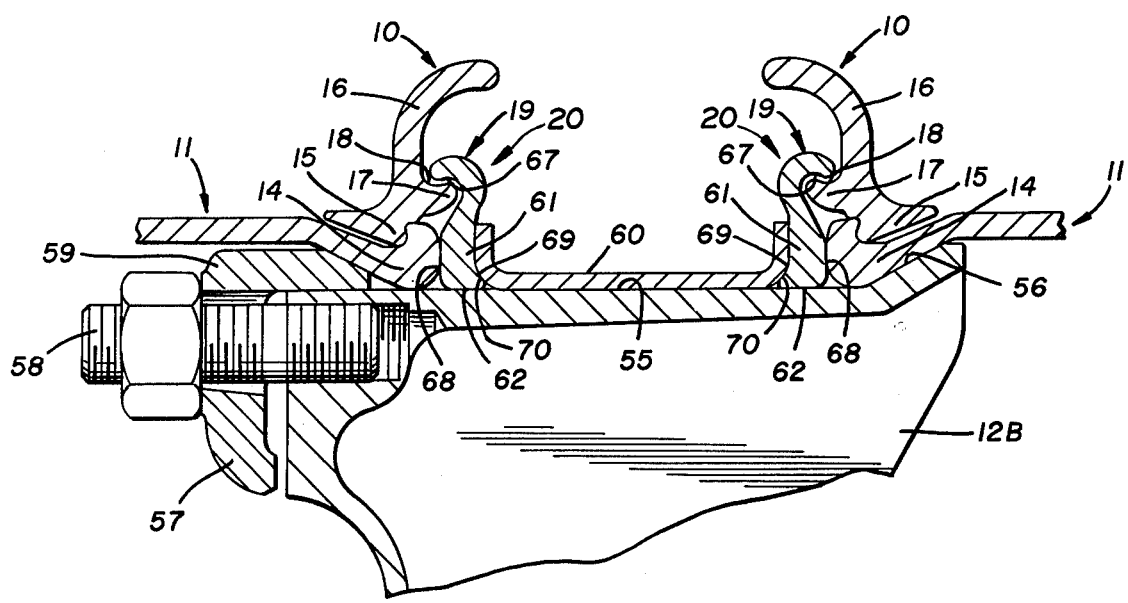
FIG. 4 is a view in section of a restraining means according to the invention comprising a dual ring and spacer assembly for a dual wheel.

Referring to FIGS. 4 and 5, the dual wheel 12B mounts inner and outer rims 11 separated by a spacer. According to the invention, each rim 11 used with a wheel 12B is interchangeable and has the same operative components, including the axial projection 17, as described above. As is conventional, the wheel 12B has a relatively wide felly surface 55 with a boss or stop surface 56 at the axially inner end for mating engagement with a radially inclined surface on the cove area 14 of the inner rim. The outer rim 11 is secured to the wheel 12B by a series of conventional clamp lugs 57 on bolt 58. A clamp lug 57 has an axially oriented leg 59 adapted for engagement with a radially inclined surface on the cove area 14 of the outer rim.

The embodiment of the restraining means 20 depicted in FIG. 4 is a dual ring and spacer assembly. Each assembly has an annular rigid and non-deformable conventional "U-shaped" spacer 60 seated on the wheel felly surface 55. The spacer 60 serves both to separate the inner and outer rims 11 and to functionally position the dual restraining rings 61. Each restraining ring 61 is an annular member having a radially inner surface 62 for seating on the wheel felly surface 55.

The axial restraining projection 19 is on the radially outer portion of the ring 61, so as to provide a radially inwardly oriented hook surface 67 overlying the corresponding surface 18 on the axial projection 17 of an adjacent bead ring 10. Radially inwardly of the restraining projection 19 the base portion of a ring 61 has a radially directed and slightly concave surface 68 for clamping engagement with the cove area 14 of an adjacent rim 11. The opposite side of the base portion of a ring 61 has a surface 69 adapted for secure mechanical engagement with a corresponding surface 70 on the spacer 60. As shown, the ring surface 69 is concave for mating with the right-angled spacer corner surface 70.

The embodiment of the restraining means 20 depicted in FIG. 5 is a spacer. The spacer 80 is an annular rigid and non-deformable member seated on the wheel felly surface 55. The spacer 80 serves both to separate the inner and outer rims 11 and to functionally carry the axial restraining projections 19.

As shown, the radially outer portions 81 of a spacer 80 are integrally formed and are "C-shaped." The axial restraining projections 19 are the upper legs of the spacer portions 81, providing a radially inwardly oriented surface 87 overlying the corresponding surface 18 on the axial projection 17 of the adjacent bead rings 10. Radially inwardly of the outer portions 81, the spacer 80 has radially directed surfaces 88 for clamping engagement with the cove area 14 of adjacent rims 11.

Figure 6:
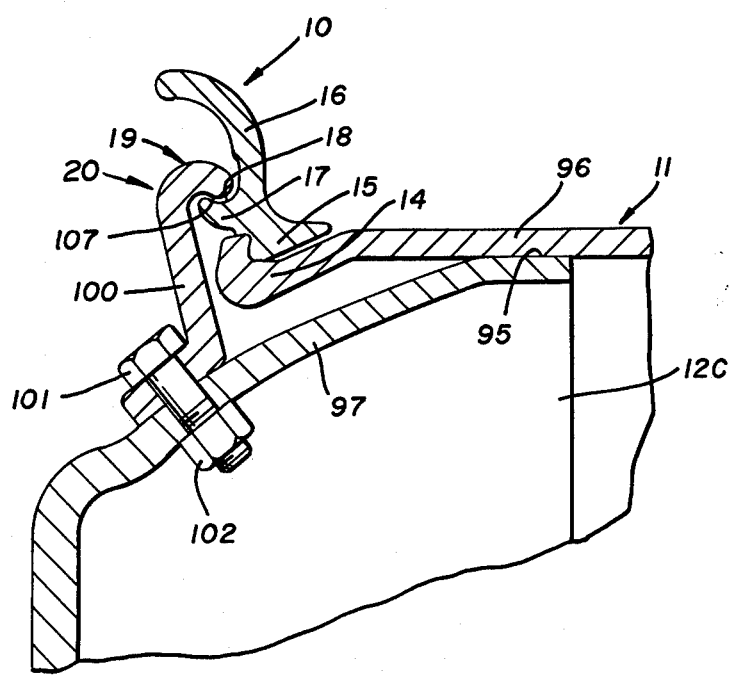
FIG. 6 is a view in section of a restraining means according to the invention comprising clamping elements on a disc wheel.
Figure 7:
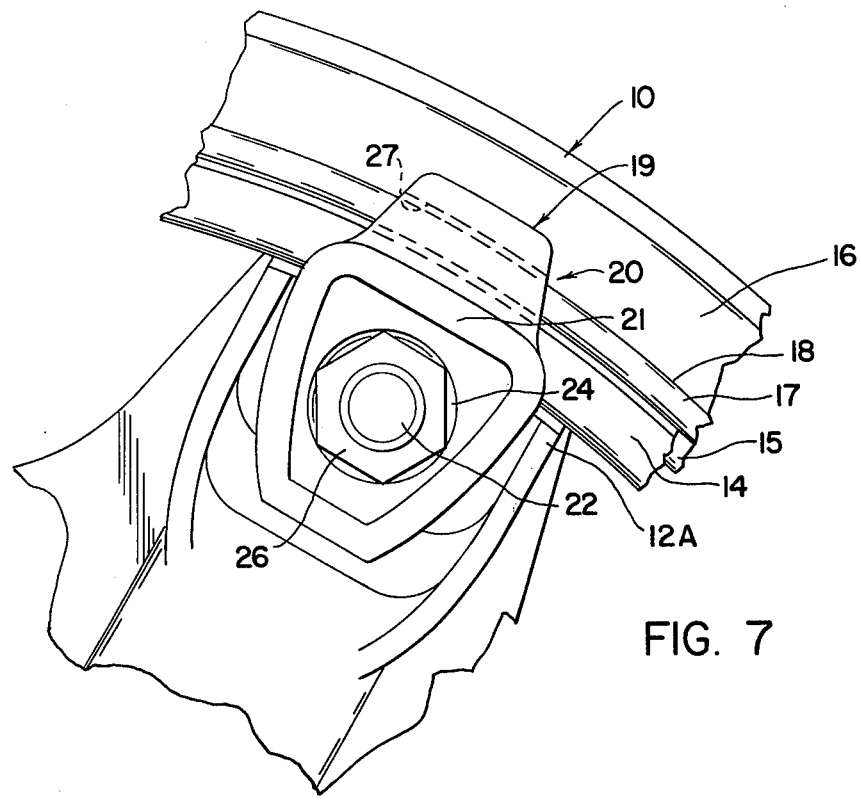
FIG. 7 is a plan view showing the substantially triangularly-shaped clamp lugs mounted on bolts projecting axially of the wheels as also shown in FIG. 1.

Referring to FIG. 6, the single wheel 12C is a disc wheel, of conventional stamped or spun steel construction, having an integral felly surface 95. The medial portion 96 of a rim 11 is seated on and suitably secured to the felly surface 95 in a conventional manner. According to the invention, a rim 11 used with a wheel 12C has the same operative components, including the axial projection 17, as described above.

The embodiment of the restraining means 20 depicted in FIG. 6 is a restraining element projecting radially from the body portion 97 of a wheel 12C. As shown, the axial restraining portion 19 is carried on the radially outer end of a projecting element 100. An element 100 may be mechanically attached to the wheel 12C, as by bolts 101 and nuts 102 as shown. Alternatively, the projecting element 100 could be attached to the wheel 12C as by welding. Also, an element 100 may be a series of individual elements arranged circularly around the wheel 12C. Alternatively, the projecting elements 100 could be an integral or annular structure carrying the restraining projections 19 at spaced intervals. In any event, the invention requires that the projecting elements 100 carry the restraining projections 19 so as to provide a radially oriented hook surface 107 overlying the corresponding surface 18 on the axial projection 17 on the bead ring 10.

What is claimed is:

1. The combination of a vehicle wheel and at least one tire carrying rim, each said rim comprising a fixed integral bead flange and a removable bead ring having a radially directed bead flange, characterized in that the medial portion of said bead flange of the removable bead ring has an axial projection providing a radially outwardly oriented annular shelf surface and that the wheel mounts a restraining means comprising an axial projection providing a radially inwardly oriented surface which in mounted condition is positioned and spaced radially outwardly of and opposed to said annular shelf surface, said opposed surfaces being intended for mating engagement in the event a tire on said rim is unintentionally deflated.

2. A vehicle wheel according to claim 1 wherein an inner tire carrying rim and an outer tire carrying rim are separated from each other by a spacer mounted on a wheel felloe surface, further characterized in that said restraining means is formed by said spacer which comprises an annular rigid member having dual radially outer portions, each with a said axial restraining projection thereon, the radially inwardly oriented surface of each axial restraining projection being positioned and spaced radially outwardly of and opposed to an annular shelf surface on an adjacent removable bead ring.

3. A vehicle wheel according to claim 2 wherein an inner tire carrying rim and an outer tire carrying rim are separated from each other by a spacer mounted on a wheel felloe surface, further characterized in that said restraining means comprises an assembly formed by said spacer and dual restraining rings seated on said wheel felloe surface between said rims, each said restraining ring in mounted condition being clamped between an adjacent rim and said spacer.

4. A vehicle wheel according to claim 2, further characterized in that said radially outer portions of said spacer are "C-shaped" having upper legs forming said axial restraining projections.

5. A vehicle wheel according to claim 2 wherein said wheel comprises a felly surface for seating the medial portion of said tire carrying rim and said wheel is a disc wheel comprising a body portion, and said restraining means comprises a series of clamp elements positioned circumferentially around said wheel and which in mounted condition project radially from said body portion.

6. A vehicle wheel according to claim 5 wherein said clamp elements are carried by a full ring.

7. A vehicle wheel according to claim 2 wherein said restraining means comprises a series of clamp lugs positioned circumferentially around said wheel, each said clamp lug having an axially inner face which in mounted condition abuts with said rim and an axial projection which in mounted condition abuts with said wheel.

8. A vehicle wheel according to claim 7 wherein said clamp lugs are carried by a full ring.

9. A vehicle wheel according to claim 7 wherein said clamp lugs are two-piece having an axially outer element with an axial projection thereon which in mounted condition abuts with said wheel, and an axially inner element with an axially inner face thereon which in mounted condition abuts with said rim, said axial restraining projections being on said axially inner elements.

10. A vehicle wheel according to claim 9 wherein said axially outer and axially inner clamp elements have mating faces in conjugate contact permitting limited adjustment of said axial restraining projection relative to said removable bead ring during mounting on said wheel.

11. A vehicle wheel according to claim 10 wherein the radially inner end of said axially outer element has an enlarged bore permitting movement thereof relative to a mounting bolt projecting radially of said wheel.